Patented July 26, 1927.

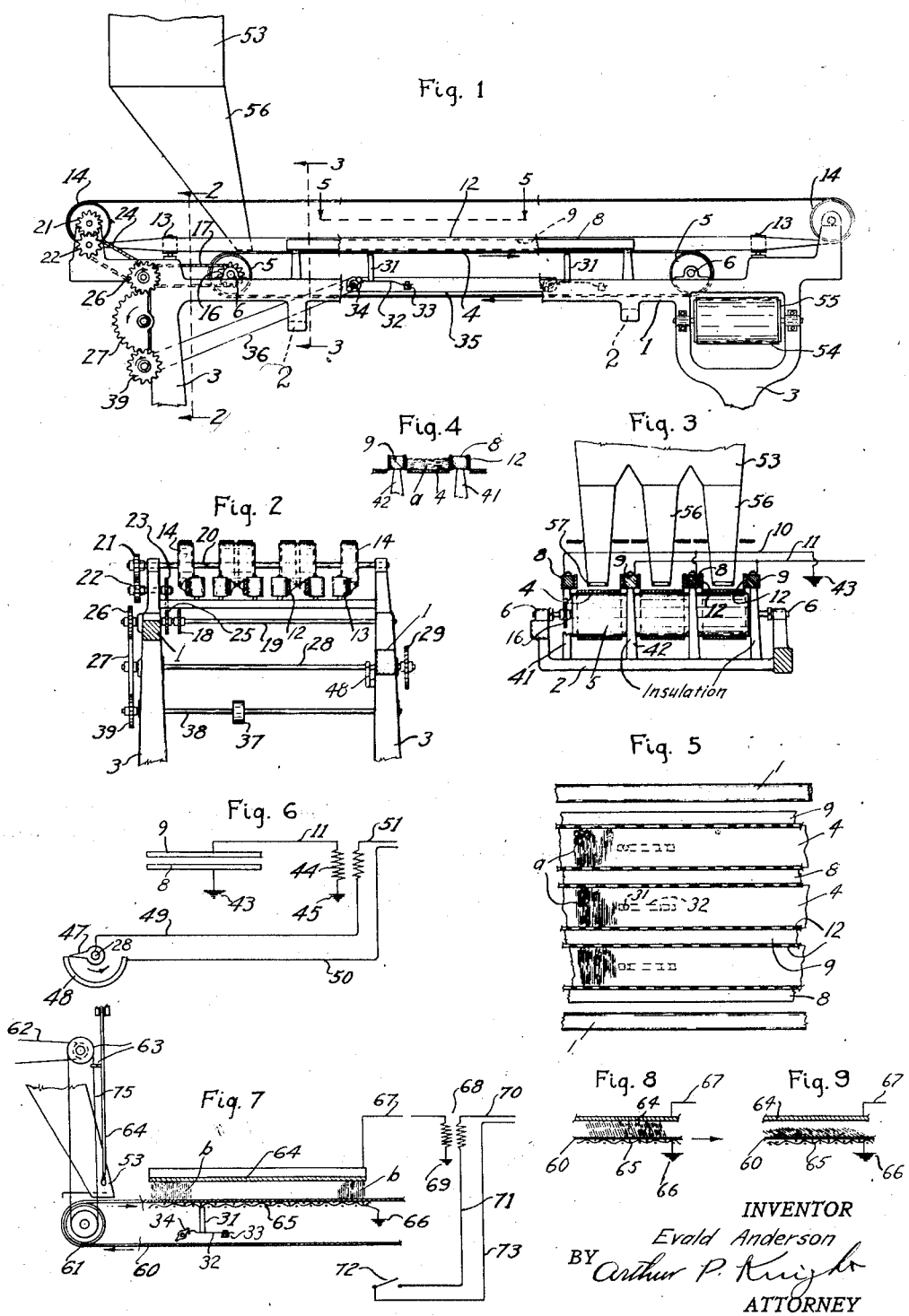

1,636,977

UNITED STATES PATENT OFFICE.

EVALD ANDERSON, OF ALHAMBRA, CALIFORNIA, ASSIGNOR TO INTERNATIONAL PRECIPITATION COMPANY, OF LOS ANGELES, CALIFORNIA, A CORPORATION OF CALIFORNIA.

METHOD AND APPARATUS FOR SUPPLYING FIBROUS MATERIAL IN ALIGNED CONDITION.

Application filed January 5, 1926. Serial No. 79,497.

This invention relates to the alignment of fibers or fibrous materials in fibrous aggregates of a nonconducting nature, and to the delivery of the aligned material for the purpose of spinning or for any other purpose in which it is necessary to have the fibers in aligned condition before use. By alignment is meant the arrangement of the fibers in parallel lines so that they all extend in the same direction.

The main object of the present invention is to provide an advantageous method and apparatus for accomplishing such alignment and delivery. A particular object of the invention is to provide for alignment of the fibers by electrostatic action, and for delivery of the fibers so aligned to a further operation requiring such alignment.

The method which I use for this purpose consists briefly in subjecting an aggregate or mass of divided nonconducting fibrous material to the action of a high potential electrostatic field in such manner as to effect alignment of the fibers parallel to the direction of the lines of force of such field and then, when the fibers are all properly aligned, removing the same from the region of the electrostatic field while preserving the alignment, and delivering them in this condition so that they may be used for the desired purpose.

The accompanying drawings illustrate forms of apparatus by which the above described method may be carried out and referring thereto:

Fig. 1 is a partly sectional side elevation of one form of such apparatus.

Fig. 2 is a transverse section one line 2—2 in Fig. 1.

Fig. 3 is a transverse section on line 3—3 in Fig. 1.

Fig. 4 is a partial sectional view similar to Fig. 3, showing the alignment of the fibers between the electrodes.

Fig. 5 is a plan view of a portion of such apparatus taken on line 5—5 in Fig. 1.

Fig. 6 is a diagrammatic representation of the electrical connections used in the apparatus shown in Fig. 1.

Fig. 7 is a diagrammatic vertical section of another form of apparatus.

Figs. 8 and 9 are partial sectional views representing certain stages of the operation as carried out in the apparatus shown in Fig. 7.

The apparatus shown in Fig. 1 comprises a supporting frame having longitudinal or side members 1 and transverse members 2 and supported in any suitable manner for example by means of legs 3. A plurality of endless belts 4 are provided for supporting the fibrous material and conveying the same through the region of the electrostatic field, said belts being mounted for example on pulleys 5 rotatably mounted in bearings 6 on the supporting frame. Each of the conveying belts 4 may be of a width corresponding to the distance which may advantageously be provided between opposing electrodes, such distance depending upon the length of the fibers to be aligned and being in some cases, for example, four to six inches. There may be any desired number of such belts and, as shown, all of the belts may run over a single pulley at each end. Said belts may be of any desired length. Mounted just above the level of the upper run of the conveyer belts and between the several belts are a plurality of electrode means comprising for example fixed metallic electrodes 8 and 9, the electrodes 8 and 9 being alternately arranged and spaced apart a suitable distance as above mentioned, and electrodes 8 being connected by wire 10 and electrodes 9 by wire 11 to a high voltage electric circuit of the desired voltage as hereinafter described. I also prefer to provide side belts 12 at each side of each belt 4 and passing in contact with or close to the faces of the respective electrodes. Said side belts may pass over guide pulleys 13 at the end of the machine and then turn and pass over pulleys 14.

Conveying belts 4 and side belts 12 may be driven in any suitable manner. One of the pulleys 5 may be provided for example with a sprocket 16 connected by driving chain 17 to another sprocket 18 on shaft 19. The shaft 20 of the pulleys 14 at the same end of the machine may be connected by gearing 21 and 22 to sprocket 23 which may in turn be connected by chain 24 to another sprocket 25 on shaft 19. The several sprockets and gears are of such relative sizes that conveyor belts 4 and side belts 12 are driven at the same speed. Said shaft 19 may be provided with gear wheel 26 adapted to be engaged by an intermittent drive wheel 27 during a portion only of the revolution of such intermittent gear wheel. For example as shown the gear wheel 27 may be provided with gear teeth on approximately one half of its periphery. The intermittent gear 27 may be mounted on shaft 28 which may be provided with any suitable means for driving the same such as sprocket 29 operated by sprocket chain not shown from a countershaft or other driving shaft adapted to be set in operation by any suitable means when the machine is to be operated.

Suitable means are preferably provided for rapping or jarring the conveyer belts 4 during the electrostatic aligning operation, such means comprising, for example, hammers 31 of insulating material mounted on springs 32 supported by cross bars 33, there being one or more of such hammers for each belt. A rotating arm 34 is provided for operating each spring 32, the ends of said arm being adapted in its rotation to engage the corresponding spring 32 and pull said spring down and then release the same so as to cause the hammer 31 to strike the underside of the corresponding conveyer belt. Arms 34 may be rotatably mounted between the side frame members 1 and may be driven in any suitable manner for example by means of drive belts 35 and 36. Drive belt 36 may be driven by pulley 37 mounted on shaft 38 and said shaft may be provided with a gear wheel 39 adapted to be engaged by the intermittent drive gear 27 above described. The gear wheel 39 is located at the opposite side of gear 27 from the gear wheel 26 aforesaid so that gear 39 is engaged by gear 27 so as to be driven during the time that gear 26 is idle.

The electrodes 8 and 9 may be mounted by means of supporting columns 41 and 42 respectively on the transverse members 2 of the supporting frame, in such manner as to be insulated from one another. The wire 10 connected to electrodes 8 may be grounded as indicated at 43 and the supporting columns 41 for said electrodes may be of metal, while the supporting columns 42 for electrodes 9 may be made of insulating material so that the electrodes 9 may be maintained at high potential with respect to the electrodes 8 and to the frame and other parts of the machine which are also grounded. As indicated in Fig. 5, wire 11 may lead to the secondary winding of step-up transformer 44 adapted to deliver the desired voltage, the other end of such winding being grounded as indicated at 45 so as to complete the high tension circuit. The voltage employed depends upon the distance between the electrodes 8 and 9, and is in any case sufficient to give an electrostatic field of sufficient strength to cause alignment of the fibers; for example it may be from 20,000 to 50,000 volts.

Contact means are provided for intermittently establishing and breaking the electrostatic field, such contact means comprising for example a contact point 47 mounted on shaft 28 and a fixed contact segment 48 adapted to be engaged by said contact point on rotation thereof. The position of contact point 47 with respect to intermittent gear 27 is such that the contact point 47 makes contact with segment 48 during the time that gear wheel 27 is not in engagement with gear 26. The primary winding of the transformer 44 may be connected at one side by wire 49 to contact point 47, and from contact segment 48 wire 50 may lead to one side of a source of relatively low tension alternating current supply, the other side of such source being connected by wire 51 to the other side of the transformer primary winding.

Suitable means such as feed hopper 53 are provided for supplying the fibrous aggregate to the conveyer belts 4 through feed spouts 56, and means such as conveyer belt 54 mounted on pulley 55 may be provided for carrying away the aligned fibers.

In carrying out my process in the apparatus above described shaft 28 is set in motion by driving means 29. The fibrous aggregate or mass to be treated is supplied in crushed or divided condition, that is to say, broken up into individual fibers or small bundles of fibers, through feed hopper 53 and through the several discharge spouts 56 thereof onto the respective conveying belts. During one half of each revolution of shaft 28 and gear wheel 27 said gear wheel engages gear 26 so as to drive both the conveyer belts 4 and the side belts 12 in such direction that the portions of such belts adjacent the region of the electrostatic field travel in the same direction, that is from left to right in Fig. 1. As the conveyer belts 4 pass under the discharge openings 57 of feed spouts 56 the fibrous material is drawn or allowed to fall through such openings and is carried along on top of the belts in layers of suitable thickness. This action is continued as long as gear wheel 27 remains in engagement with gear 26.

The driving mechanism is so designed that the length of travel given to the conveyer belts during one half rotation of gear 27 is substantially equal to the length of electrodes 8 and 9 so that the fibrous material which is at a position opposite the left end of the electrodes in Fig. 1 at the start of the motion of the belt is brought to a position opposite the right end of the electrodes at the end of such movement. At this time the gear wheel 27 passes out of engagement with gear 26 and engages with gear 39 so as to set in operation the hammer means 31 above described, and jar or rap the conveyer belts so as to loosen the fibrous material thereon. Simultaneously with the engagement of wheel 27 with gear 29 contact point 47 passes into engagement with contact segment 48 and thus a high potential electrostatic field is established between alternate electrodes 8 and 9 so that the fibrous material resting upon the portion of each conveyer belt between the electrodes is subjected to the action of such electrostatic field and since the lines of force of such field extend in a direction perpendicular to the faces of the electrodes, the fibers due to their non-conducting nature become oppositely charged at their respective ends and arrange themselves parallel to such lines of force. The fibers so aligned will tend to rise off the conveyer belts and bridge across between the side belts 12 as indicated at (a) in Figs. 4 and 5. The material on the conveyer belts is continually subjected to a jarring action so that the fibers become loosened from one another and move about on the belts until they are all aligned in the proper direction by the electrostatic field.

It will be observed that during the time of the electrostatic aligning operation the conveyer belts and side belts remain stationary as far as longitudinal motion is concerned, the conveyer belts being however subjected to rapid vertical vibration by the action of the hammer means. At the end of a certain period contact point 47 passes out of engagement with contact segment 48, thus breaking the electrostatic field and at the same time gear wheel 27 passes out of engagement with gear 39 causing operation of the hammer means 31 to cease. The aligned fibers thereupon fall in aligned position upon the conveyer belts and extend transversely of such belts and the conveyer belts and side belts are simultaneously set in motion as above described due to re-engagement of gear 27 with gear 26. The aligned fibers are carried to the right end of the conveyer belt 4 where they are allowed to fall upon conveyer belt 54 by means of which they may be delivered to any suitable machine or apparatus for subjecting them to a further operation requiring preliminary alignment of the fibers. For example, the aligned fibers may be delivered or supplied by belt 54 to a spinning machine of any suitable type for subjecting them to a spinning operation. While the fibers are allowed to fall from conveyer belts 4 onto conveyer belt 54, the distance through which they fall is so small that their alignment is preserved substantially completely and the fibers are therefore all arranged longitudinally of conveyer belt 54. All of the fibrous material which was in the region of the electrostatic field during the last electrostatic aligning operation is thus moved out of such field and a new charge of fibrous aggregate moved into position between the electrodes. The operation is therefore in one sense intermittent in that the fibrous material is first brought into the region of the electrostatic field, then aligned electrostatically and then removed from such region, but in another sense it is continuous in that a fresh charge of non-aligned material is moved into the region of the electrostatic field at the same time that a batch of aligned fibers are moved out of such region.

While I have illustrated and described the use of alternating current electricity for producing the electrostatic field, and while such alternating current operates satisfactorily and is therefore in general to be preferred because of simplicity, it should be understood that direct current may also be used for this purpose, for example, rectified alternating current, and my invention should therefore be understood as including the use of either alternating or direct current.

Another apparatus and method of carrying out my invention are illustrated in Figs. 7 to 9. In this case a single conveyer belt 60 is mounted to run over pulley 61 at one end and over a suitable pulley, not shown, at the other end and may be adapted to be thrown into and out of driving relation with a driving belt 62 for example by means of a loose pulley and a belt shifting device indicated at 63. The handle 64 of such belt shifting device may extend down to a position near the belt for manual operation thereof. A rigid metallic electrode 64 is mounted above and at a suitable distance from the upper run of conveyer belt 60 and another electrode comprising for example a metal screen or other metallic member 65 is placed just beneath the upper run of conveyer belt 60. The distance between electrodes 64 and 65 depends to some extent upon the length of the fibers to be aligned, so as to provide an air gap of such width that the fibers will readily build up end to end and bridge across between the electrodes. Electrode 65 may be grounded as indicated at 66 and electrode 64 may be connected by wire 67 to the secondary winding of step-up transformer 68, the other side of such secondary winding being grounded at 69 so as to complete the high potential circuit through the ground. The primary winding of transformer 68 is connected by wire 70 to a source of alternating current supply and by wire 71 to a switch 72 which may be either manually operated as shown, or may be automatically operated, for example in a manner similar to that above described. From switch 72 wire 73 leads to the other side of the current supply. Hammer means 31 may also be provided in this case which may be substantially the same and operated in substantially the same manner as above described, such hammer means being adapted in this case to jar the electrode screen 65 and hence jar the belt resting upon said screen. Feed hopper 53 may be provided for supplying the material onto the conveyer belt 60. Said conveyer belt may be of any suitable width and the electrode means may be of substantially the same width as the conveyer belt and of any suitable length, so that any desired amount of fibrous material may be aligned at one operation.

In the operation of this form of the invention the conveyer belt 60 is set in operation in the direction indicated by arrows in Fig. 7, by operation of the belt shifting means 63 so as to throw belt 75 from the loose pulley onto the driving pulley in the usual manner of such devices. Fibrous material is thus drawn or allowed to fall from the hopper onto the conveyer belt and is carried thereby into position between the electrodes 64 and 65, such operation being continued until any previously aligned material is removed from the region of the electrostatic field and such region is substantially filled with material to be aligned. The belt shifter 63 is then operated to throw belt 75 onto the loose pulley so as to stop the conveyer belt in this position.

Switch 72 is then closed either manually or automatically and hammer means 31 set in motion so that the fibrous material on the conveyer belt is subjected to the action of an electrostatic field at a sufficiently high voltage to effect the aligning operation and is also subjected to a jarring action applied to screen 65 and hence to the underside of the belt, whereupon the fibers are as before caused to align themselves between the electrodes and in a direction perpendicular to the faces of the electrodes, as indicated at (b) in Fig. 7. When the fibers are aligned in this manner the electrostatic field may be broken by opening switch 72 and the aligned material then moved out of the field and a new charge of the material brought into the region of the field by further operation of belt 60. In order to provide however for maintaining the alignment of the fibrous material when the electrostatic field is broken and prevent such fibers from toppling or falling in all directions upon the conveyer belt I prefer to operate the belt shifter 63 so as to start the conveyer belt 60 in operation slightly before breaking the electrostatic field. The lower ends of the aligned fibers are thus carried to the right by frictional engagement with the conveyer belt as indicated in Fig. 8 so as to be all inclined in the same direction. When the fibers have thus been given a slightly inclined position the electrostatic field is broken whereupon the fibers fall onto the conveyer belt all aligned in the same direction as indicated in Fig. 9. In the continued operation of the belt, the aligned fibers are removed from the region of the electrostatic field while preserving their alignment, and may as before be conveyed or delivered to any suitable machine or apparatus for subjection to a subsequent operation requiring such alignment.

I claim:

1. The method of supplying fibers of non-conducting material in aligned condition, which comprises subjecting a fibrous aggregate of such material in divided condition to an electrostatic field so as to effect alignment of the fibers in a direction substantially parallel to the lines of force of such field, and then removing such fibers from the region of the electrostatic field and delivering the fibers while maintaining their aligned condition for subjection to a subsequent operation requiring such alignment.

2. The method of supplying fibers of non-conducting material in aligned condition which comprises bringing a body of fibrous non-conducting material in divided condition into position between opposing electrodes, establishing an electrostatic field between said electrodes so as to cause the fibers to arrange themselves in substantially parallel lines in the direction of the electrostatic field, then breaking the electrostatic field and moving the aligned fibers out of position between said electrodes in such manner as to preserve the alignment thereof, and delivering the fibers while in aligned condition for subjection to a subsequent operation requiring such alignment.

3. An apparatus for supplying fibers of non-conducting material in aligned condition comprising electrode means, means for moving a body of non-conducting fibrous material into position between said electrode means, means for producing a high potential electrostatic field between said electrode means so as to cause the fibers to align themselves in the direction of the electrostatic field and means for subsequently removing the aligned fibers from their position between the electrodes and delivering said fibers while preserving the alignment thereof.

4. An apparatus for supplying fibers of non-conducting material in aligned condition comprising a pair of opposing electrodes, means for bringing a body of non-aligned non-conducting fibrous material into position between said electrodes, means for establishing a high potential electrostatic field between said electrodes after said fibrous material is brought into such position so as to cause the fibers of such material to align themselves in the direction of the electrostatic field, means for discontinuing the electrostatic field when the fibers are substantially aligned, and means for subsequently removing the aligned fibers from position between the electrodes and delivering such fibers while maintaining the alignment thereof.

5. An apparatus as set forth in claim 4 and comprising in addition means for agitating the mass of fibrous material when in position between the electrodes and during the maintenance of the electrostatic field so as to facilitate the alignment of the fibers.

6. A construction as set forth in claim 4 and comprising in addition means for automatically controlling the operation of the means for bringing the fibers into position between the electrodes, the means for establishing the electrostatic field, the means for discontinuing the electrostatic field, and the means for removing the aligned fibers from position between the electrodes in such manner as to cause said means to operate in the sequence set forth in claim 4.

In testimony whereof I have hereunto subscribed my name this 24th day of December, 1925.

EVALD ANDERSON.